US012729450B2

(12) United States Patent
Lessle

(10) Patent No.: US 12,729,450 B2
(45) Date of Patent: Sep. 8, 2026

(54) METHOD FOR OPTIMIZING CONSUMPTION OF THE OPERATING RESOURCES OF OZONE GENERATORS

(71) Applicant: ProMinent GmbH, Heidelberg (DE)

(72) Inventor: Thomas Lessle, Karlsruhe (DE)

(73) Assignee: PROMINENT GMBH, Heidelberg (DE)

( * ) Notice: Subject to any disclaimer, the term of this patent is extended or adjusted under 35 U.S.C. 154(b) by 771 days.

(21) Appl. No.: 18/079,103

(22) Filed: Dec. 12, 2022

(65) Prior Publication Data

US 2023/0193491 A1 Jun. 22, 2023

(30) Foreign Application Priority Data

Dec. 22, 2021 (DE) .................... 10 2021 134 410.7

(51) Int. Cl.

| | |
|---|---|
| ***C25B 15/029*** | (2021.01) |
| ***C01B 13/11*** | (2006.01) |
| ***C25B 1/13*** | (2006.01) |

(52) U.S. Cl.

CPC .......... *C25B 15/029* (2021.01); *C01B 13/115* (2013.01); *C25B 1/13* (2013.01); *C01B 2201/90* (2013.01)

(58) Field of Classification Search

CPC ...................................................... C01B 13/10

See application file for complete search history.

(56) References Cited

U.S. PATENT DOCUMENTS 3,798,457 A 3/1974 Lowther
9,233,848 B2 * 1/2016 Nakatani ................ C01B 13/11

FOREIGN PATENT DOCUMENTS

DE 2026622 C2 12/1970

OTHER PUBLICATIONS

Grant ("Tutorial: Automatically Creating a Performance Map of a Heat Pump Water Heater", 2019, pp. 1-13 (Year: 2019).*

* cited by examiner

*Primary Examiner* — Alexander W Keeling
(74) *Attorney, Agent, or Firm* — PAUL & PAUL

(57) ABSTRACT

The present invention comprises a method for optimizing the consumption of an operating resource of ozone generators in which an oxygen-containing gas is conveyed through an existing gap between two conductors, between which there is a potential difference, wherein the ozone generator has a generator rated power $P_n$ that is achieved when the ozone generator has an electrical power $P_{el}=P_{el,max}$ coupled and the oxygen-containing gas is conveyed through the gap with a gas flow $\varphi_N$, such that the gas that flows through has an ozone concentration $c_{ozN}$, wherein the method comprises the following steps:

A) specify a required generator power $P_{target}$,

B) if $0<P_{target}<P_n$, reduce both the electrical power $P_{el}=P_{el,actual}<P_{el,max}$ and the ozone concentration $c_{oz,actual}<c_{ozN}$, wherein $P_{el,actual}$ and $c_{oz}$ is selected in order to achieve the required generator power $P_{target}$.

5 Claims, 2 Drawing Sheets

1,2
1,1
1,0
0,9
0,8
0,7
0,6
0,5
0,4
0,3
0,2
0,4
0,5
0,6
0,7
0,8
0,9
1,0
1,1
1,2
1,3
1,4
1,5

1,1
1,0
0,9
0,8
0,7
0,6
0,5
0,4
0,3
0,2
0,1
0,0
0,0
0,1
0,2
0,3
0,4
0,5
0,6
0,7
0,8
0,9
1,0
1,1

METHOD FOR OPTIMIZING CONSUMPTION OF THE OPERATING RESOURCES OF OZONE GENERATORS

CROSS-REFERENCE TO RELATED APPLICATION

This application claims the priority of German Application No. 10 2021 134 410.7, filed on Dec. 22, 2021, incorporated herein by reference.

The present invention relates to a method for optimizing consumption of an operating resource of ozone generators. In ozone generators, an oxygen-containing gas is typically conveyed through a gap present between two conductors among which there is a difference in potential. Oxygen can then be converted to ozone by the potential difference. In order to maintain the potential difference, an electrical power supply must be provided to the ozone generator. In addition, the oxygen-containing gas must be provided and conveyed through the gap.

The ozone generators have a generator rated power $P_n$, which determines the generation of ozone per unit of time at nominal conditions (i.e., at a certain ozone concentration, at a certain gas flow rate, at a certain temperature of the operating resources, etc.). This generator rated power $P_n$ is reached when an electrical maximum power $P_{el}=P_{el,max}$ is coupled into the ozone generator and the oxygen-containing gas is conveyed through the gap with the particular gas flow $\varphi_{Nn}$. As a result, the gas exiting the ozone generator has an ozone concentration of $c_{ozN}$.

If the power coupled electrically into the generator is kept constant and the gas flow is increased ($>\varphi_n$), the ozone concentration in the gas decreases ($<c_{ozn}$). Overall, however, an increased volume of ozone ($>P_n$) is achieved. However, this requires a higher gas consumption.

If the power coupled electrically into the generator is kept constant and instead the gas flow is reduced ($<\varphi_n$), the ozone concentration increases ($>c_{ozn}$).

For example, ozone is used for water treatment.

To operate the ozone generator, these three operating resources are essentially needed:

- electrical power to maintain the potential difference,
- oxygen-containing gas (e.g., dry air or pure oxygen), and
- a coolant to remove the energy generated by discharge in the form of heat.

In general, the coolant could be omitted. However, because ozone is instable it decomposes into oxygen and this decomposition process is temperature dependent so that the decomposition occurs faster at high temperature than at low temperature, it is usually advantageous to use a corresponding coolant.

The ozone generator is adapted to the usage process. Generally, for efficiency reasons, it is advantageous to operate the ozone generator at its generator rated power.

However, the required ozone is highly variable in some applications, particularly in waterworks or wastewater treatment facilities, and will depend on the time of day and season as well as the climatic conditions.

The generator rated power is configured according to the expected peak load with the consequence that the ozone generator usually only needs to produce a fraction of the generator rated power, for example only between 50-70% or even less.

To control the ozone generator, a signal can often be provided from the process in which the ozone generator is used. This is a measure for the volume of ozone currently required and thus to be generated. In this case, there is usually a linear connection between the signal and the currently required volume of ozone.

Ozone generators typically have a corresponding input through which they can receive this signal. This pre-determines the required generator power.

For example, a normal current signal varying between 4 mA and 20 mA could be used as this signal. In this case, a 4 mA signal means a generator power of 0% of the generator rated power, a current of 12 mA means a generator power of 50% of the generator rated power, and a current of 20 mA means a generator power of 100% of the generator rated power. However, it is also possible to provide this signal in digital form, e.g., via field buses. By means of this external signal, the ozone volume to be generated can be communicated to the ozone generator.

The operation of the known ozone generators depends on the required generator power $P_{target}$ with the generator power reduced accordingly over the generator rated power.

For example, there are embodiments that reduce the supplied electrical power at a constant gas flow. This reduces the ozone concentration in the emitting gas, which at the same time reduces the generator power.

While a reduction in electrical power may conserve electrical energy, the volume of gas required remains the same.

In the prior art, ozone generators that operate at a constant ozone concentration of the emitting gas are also occasionally known, for example, because this type of application requires a constant ozone concentration. In these systems, the gas flow and the coupled electrical power are controlled by the system in such a way that the ozone concentration in the gas emitted from the generator remains largely constant, to the extent that this is physically possible at the specified ozone volume. Generally, ozone generators cannot arbitrarily increase the concentration by reducing the gas flow. Rather, for each coupled electrical power, there is a maximum concentration that cannot be exceeded. A further decrease in gas flow then again leads to a decrease in ozone concentration. Operating in this area should be avoided. In this embodiment, an additional actuator is necessary to reduce the gas flow. For example, one such actuator may be a mass flow controller that adjusts the mass flow of gas through the ozone generator, wherein the variable is determined by the system controller.

If it is not possible to realize the specified ozone volume at the required concentration, the concentration value must be automatically adjusted by the system controller to the maximum value possible to achieve the required ozone quantity. In addition, the possible flow range is also limited by the mechanical and electrical design of the actuator itself.

The known embodiments do not consider the operating costs required due to the consumption of the operating resources.

Therefore, starting from the described prior art, it is the object of the present invention to provide a method for optimizing the operating resource consumption, which is superior to the known methods and can significantly reduce the operating costs.

According to the present invention, the method of the type initially mentioned comprises the following steps:

A) specify a required generator power $P_{target}$,

B) if $0<P_{target}<P_n$, reduce both the electrical power $P_{el}=P_{el,actual}<P_{el,max}$ and the ozone concentration $c_{oz,actual}<c_{ozN}$, wherein $P_{el,actual}$ and $c_{oz}$ is selected in order to achieve the required generator power $P_{target}$.

According to the invention, therefore, not only the electrical power output but also the ozone concentration of the generated gas is reduced in order to achieve the required generator power.

By this measure, the scope of application of ozone generators can be significantly expanded, since not only operating costs can be saved, but the ozone generator can also be operated at very low power. Here, preferably in step B), the gas flow is also reduced ($\varphi_{N,ACTUAL}<\varphi_{N,max}$).

In a preferred embodiment, it is provided that the electrical power is $P_{el}$ and the ozone concentration is $c_{ozN}$, such that the operating costs of the operating resource consumption are by comparison lowered by both a reduction in electrical power at consistent gas flow $\varphi_{N,max}$ with an ozone concentration $c_{ozN}$ and a reduction in gas flow $\varphi_N$, with consistent ozone concentration $c_{ozN}$.

The present invention opens up a parameter space to the ozone generator, not exhausted by the known ozonisers. According to the invention, not only the electrical power is reduced, but also the gas flow rate $\varphi_N$ is reduced such that the ozone concentration $c_{ozN}$ of the gas emitted from the ozone generator is reduced.

In a further preferred embodiment, it is provided that for the ozone generator a characteristic performance map is determined and after step A), a minimum gas flow $\varphi_{min}$ and/or a minimum electrical power $P_{el,min}$ is determined based on the characteristic performance map and $\varphi_{actual}\geq(\varphi_{min}$ and/or $P_{el,actual}\geq P_{el,min}$ is selected in step B).

Generator power is a magnitude $P_{oz}(P_{el}, \varphi_N)$ dependent on the coupled electrical power and gas flow rate.

For example, for each of the various electrical power values $P_{el}$, the characteristic performance map may have multiple pairs of values representing the relationship between gas flow $\varphi$ and generator power $P_{oz}$. The relationship between the gas flow $\varphi$ and the electrical power $P_{el}$ is determined by inverting the equation $P_{oz,target}=P_{oz}(P_{el}, \varphi)$ by an iteration method. To this end, the functional relationship $P_{oz}(Pel, \varphi)$ must be known. If the characteristic performance map is only known point-by-point, these values can also be determined by interpolation.

This allows determining what generator power can even be achieved at a given electrical power. In doing so, it must be considered that there is also an upper limit for the gas flow $\varphi$, which is specified by the ozone generator. It is therefore easily possible to determine the minimum electrical power $P_{el,min}$, using the characteristic performance map, with which the required generator power can be achieved. Alternatively or in combination, it can also be determined which minimum gas flow $\varphi_{min}$ is necessary to achieve the required generator output.

By selecting $\varphi_{actual}\geq\varphi_{min}$ and/or $P_{el,actual}\geq P_{el,min}$, it is ensured that the desired generator power P target can also be achieved with the selected parameters.

In a further preferred embodiment, it is provided that based on the characteristic performance map multiple combinations of reduced electrical power $P_{el,actual}$ and reduced ozone concentration is $c_{oz,actual}$ are determined. For each of these combinations the associated operating costs are determined, and that combination is selected in step B) which has the lowest operating costs.

In the available parameter range, several combinations of electrical power $P_{el}$ and flow rate $\varphi$ (or ozone concentration $c_{oz}$), with which the desired generator output can be achieved, are determined and from these parameter combinations, the one at which the operating costs are the lowest is determined. Thus, if gas costs and/or power costs change significantly, the method may select other parameter combinations as advantageous ones.

Also, it would be possible if the ozone generation system was informed that the oxygen supplies were running low, to operate the system at an increased electrical power until the oxygen supply arrived, in order to reduce the amount of oxygen required. For example, the gas price used for calculating the operating costs could be significantly increased.

In a further preferred embodiment, it is provided that based on the characteristic performance map multiple combinations of reduced electrical power $P_{el,actual}$ and reduced ozone concentration $c_{oz,actual}$ are determined. For each of these combinations the associated operating costs are determined, an interpolation is made between the determined operating costs and based on the interpolation a combination is determined, at which the operating costs are minimal, wherein the combination determined in this way is selected in step B).

Further advantages, characteristics, and possible applications of the present invention will become apparent from the following description of a preferred embodiment and corresponding figures. Here:

FIG. 1 shows a schematic cross-sectional view of an ozoniser 1.

Figures 1, 2:
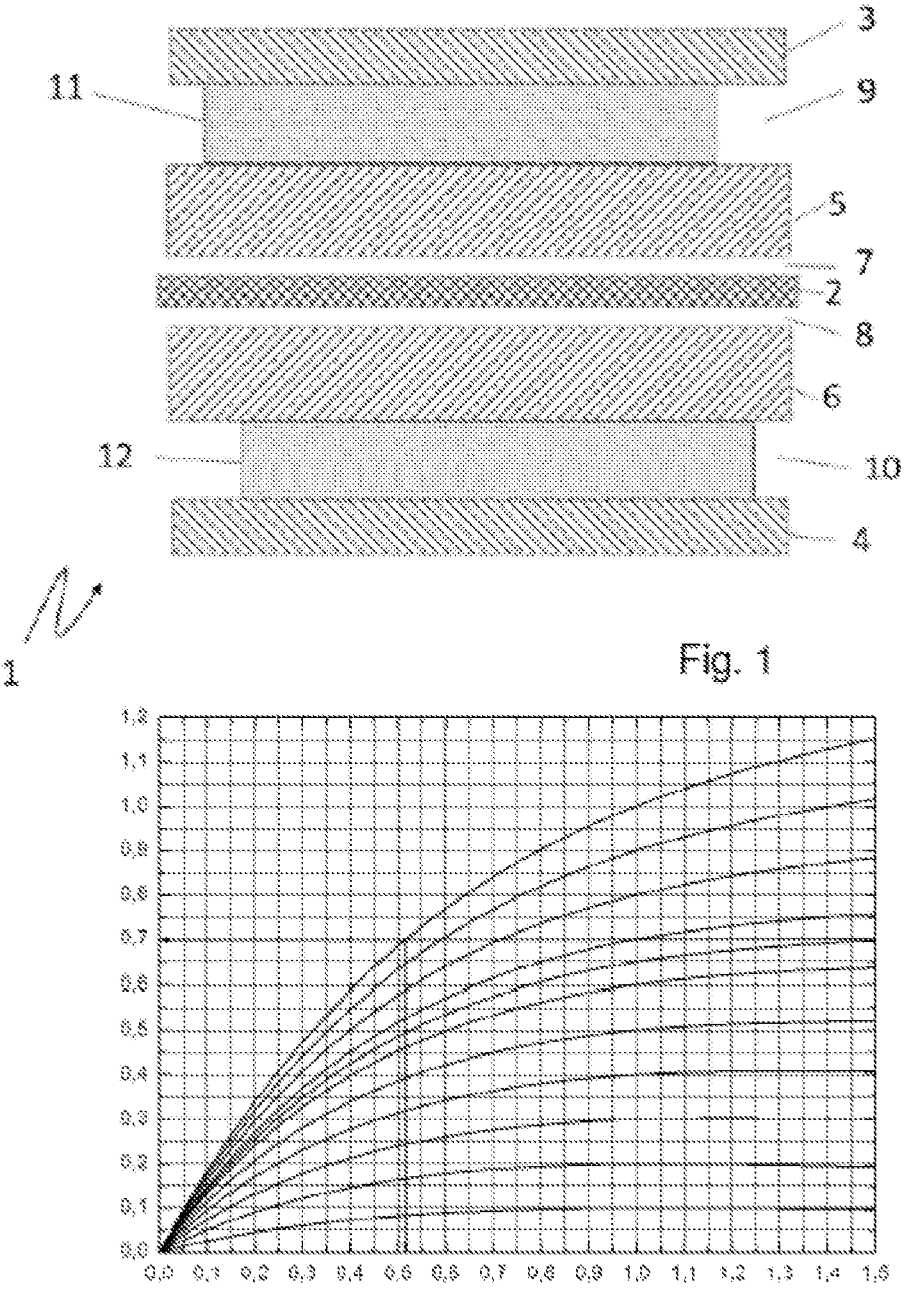
FIG. 1 is a schematic layout of an ozoniser.
FIG. 2 is an exemplary characteristic performance map.

The ozoniser 1 is constructed as a sandwich structure and comprises a plurality of planar or plate-shaped elements. The first electrode 2 is shown in the middle. High voltage can be applied between this first electrode 2 and the second electrode 3. A first dielectric 5 is arranged between the first electrode 2 and the second electrode 3 and divides the space remaining between the first electrode 2 and the second electrode 3 into the gas channel 7 and the coolant channel 9. An oxygen-containing gas is conveyed through the gas channel 7. Due to the voltage applied between the first electrode 2 and the second electrode 3, an electrical field is formed within the gas channel 7 so that the oxygen molecules can be converted to ozone molecules. However, this produces heat so that the first dielectric 5 heats up. The latter is made of a material having a high thermal conductivity, namely, in the example shown, of ceramic.

On the side of the first dielectric opposite the gas channel 7, the first coolant channel 9 is arranged. Through it, a coolant, such as water, is channelled through. The coolant channel 9 can be free or filled with a porous material 11 as shown in the example.

In the shown example, the ozoniser has a substantially mirror-symmetrical construction, i.e., it has a third electrode 4 and a second dielectric 6. The second dielectric 6 is arranged in such a way that it divides the distance between the first electrode 2 and the third electrode 4 into a gas channel 8 and a second coolant channel 10, wherein a second porous material 12, is arranged in the second coolant channel 10. If a voltage is now applied between the first electrode 2 on the one hand and the second and third electrodes 3, 4 on the other hand, and an oxygen-containing gas is conveyed through the two gas channels 7 and 8, ozone is formed therein. The corresponding heat generated is transferred via the two dielectrics 5, 6 into the coolant channel and in the example shown to the porous materials 11 and 12, through which a corresponding coolant flows, in order to dissipate the heat.

The ozone generator may also be constructed differently. Thus, the use of the porous material is unnecessary. In addition, only one gas channel is needed between two electrodes. The electrodes need not be plate shaped. For example, they could also be cylindrical or hollow cylindrical so that the electrodes can be arranged coaxially to one another and a hollow cylinder shaped gas channel forms between the electrodes.

The operating costs of such an ozoniser are determined essentially by the consumption of the gas and coolant used, as well as the electrical energy. Depending on the area of application, a variable $S_{ext}$ in percentage units of the rated power $P_n$ of the system is provided. The desired amount of ozone $P_{oz,target}$ may be represented by the flow rate $\varphi_N$ as well as the concentration $c_{ozN}$ of the ozone-containing gas as follows:

$$P_{azsoil} = \frac{S_{ext}}{100} \cdot P_n = \varphi_N \cdot c_{ozN}(P_{si}, \varphi_N)$$

The index N refers to physical standard conditions $T_N$=273.15 K and $P_N$=1013.25 hPa. The ozone concentration $c_{ozN}$ exiting the generator is determined on the one hand by the coupled electrical power $P_{el}$ and on the other hand by the gas flow $\varphi_N$ of the product gas. This means that the desired ozone quantity or desired generator power $P_{oz,target}$ can be determined under otherwise constant external conditions by the parameter combination ($P_{el}$, $\varphi_N$). At predetermined power $P_{el}$ and predetermined gas flow $\varphi_N$, a corresponding ozone concentration $c_{ozN}$ is then automatically obtained.

This means that the electrical power and/or flow rate can be changed to affect the volume of ozone generated. With regard to the operating costs incurred, the two parameters can be varied accordingly.

Thus, a worse electrical ozone efficiency factor can be accepted if the electrical energy is available at a reasonable price or even free of charge, e.g., due to the presence of a photovoltaic system, if in exchange the gas consumption is lowered.

The essence of the present invention is the implementation of the system controller in such a way that operating costs are automatically optimized. Thus, in a preferred embodiment it is provided that the operating costs for electrical power and gas used are entered into the controller. This may be done either manually or, in a preferred embodiment, automatically via an interface. In particular, in the case of automated input, the operating costs may be continuously adjusted as a function of external conditions (e.g., the time of day, weather report).

The operating costs per unit of time for electrical energy and gas are known by $$\text{BmkpT}=K_{el} \cdot P_{el}+K_{gas} \cdot \varphi_n$$

The parameters $K_{el}$ and $K_{gas}$ can be determined based on the current operating costs.

In order to be able to perform the optimization process, a $P_{oz}(P_{el}, \varphi_N)$ characteristic performance map of the system should be substantially known. In general, a few values are sufficient here in order to create the characteristic performance map by means of extrapolation and interpolation.

In FIG. 2, a corresponding characteristic performance map is shown, which has been obtained by interpolation and extrapolation. The x-axis represents the gas flow in arbitrary units. The y-axis shows the ozone amount generated in relation to the nominal ozone amount $P_n$. The individual curves are each included for different electrical powers. The higher the electrical power, the greater the amount of ozone that is generated. The same applies to the gas flow.

If, for example, an ozone output is to be generated corresponding to 70% of the rated power, a horizontal straight line can be entered at 0.7, as also shown in FIG. 2. This horizontal straight line intersects the highest electrical power characteristic curve at a point that defines the minimum gas flow necessary to produce the desired amount of ozone with the corresponding ozone generation system. The operating costs can now be calculated for all intersection points that this straight line has with the corresponding characteristic curves.

Figures 3, 4:
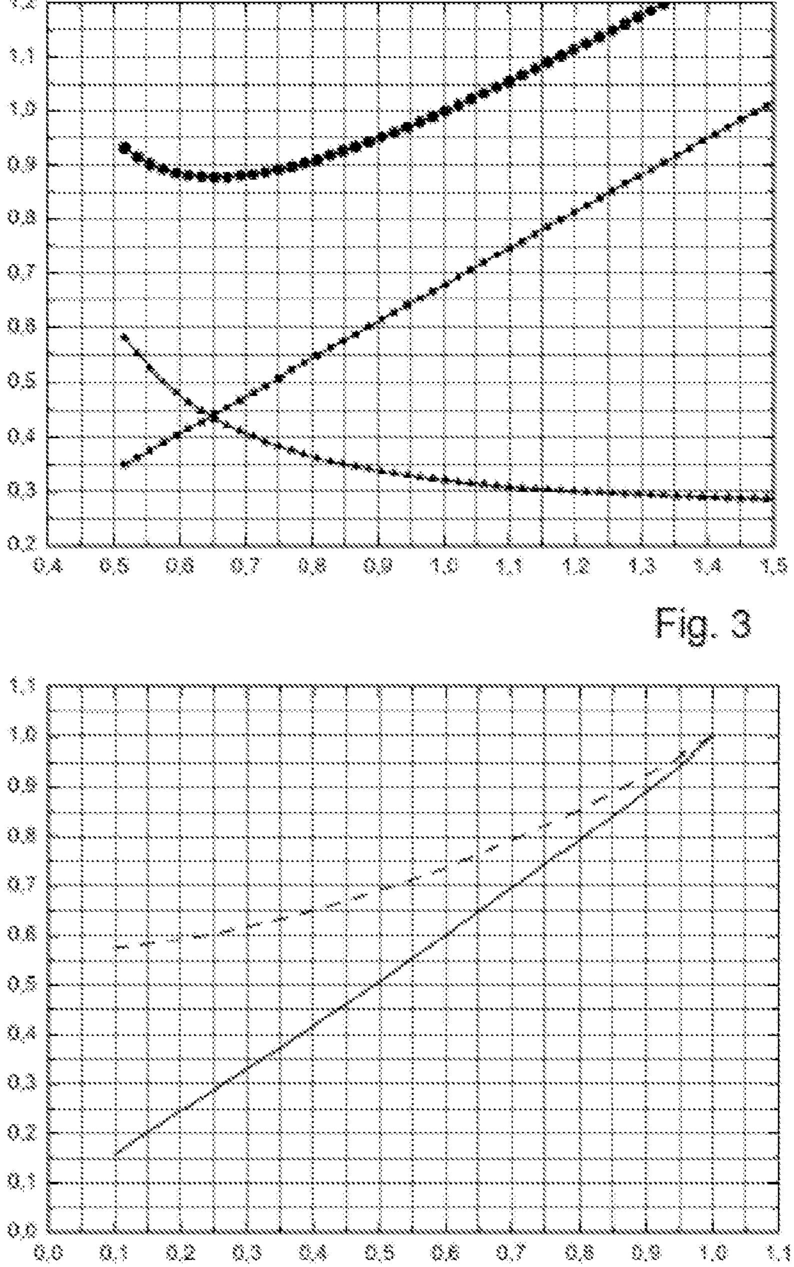
FIG. 3 is a graph of the operating costs as a function of the gas flow.
FIG. 4 is a comparison of the operating costs.

In FIG. 3, the corresponding operating costs are shown in arbitrary units on the y-axis and the gas flow relative to the nominal gas flow $\varphi_N$ on the x-axis. The linearity of increasing cost of gas (represented by the squares), the hyperbolically decreasing cost for electrical energy with increasing gas flow (represented by the triangles), and the sum of the gas and energy costs (represented by the circles) are shown.

Clearly discernible is a minimum of total cost. This minimum can be determined by interpolation. The corresponding value on the x-axis is then the gas flow that should be used to keep the operating costs as low as possible. In addition, interpolation can be omitted. In that case, only the corresponding intersection points are used to calculate the operating costs and then the gas flow is selected which incurs the lowest operating costs.

FIG. 4 shows for the desired amount of ozone relative to the rated power (x-axis), the operating costs per unit of time in arbitrary units (y-axis) and once for operation at constant gas flow (dashed line) and once at optimized operating means consumption (solid line), as is the subject matter of the present invention. While with the rated power the two curves show identical operating costs, significant costs can be saved with reduced ozone output. These are greater, the smaller the amount of ozone that is requested.

According to the invention, it is therefore possible to significantly reduce the operating costs of the ozone generator, which in particular improves the operating cost situation considerably when operating many ozone generators.

LIST OF REFERENCE NUMERALS

1 Ozoniser
2 Electrode
3 Electrode
4 Electrode
5 Dielectric
6 Dielectric
7 Gas channel
8 Gas channel
9 Coolant channel
10 Coolant channel
11 Porous material
12 Porous material

The invention claimed is:

1. A method for optimizing the consumption of an operating resource of ozone generators in which an oxygen-containing gas is conveyed through an existing gap between two conductors, between which there is a potential difference, wherein the ozone generator has a generator rated power $P_n$ that is achieved when the ozone generator has an electrical power $P_{el}=P_{el,max}$ coupled and the oxygen-containing gas is conveyed through the gap with a gas flow $\varphi_N$, such that the gas that flows through has an ozone concentration $c_{ozN}$, wherein the method comprises the following steps:

A) specify a required generator power $P_{target}$,

B) if $0<P_{target}<P_n$, reduce both the electrical power $P_{el}=P_{el,actual}<P_{el,max}$ and the ozone concentration $c_{oz,actual}<c_{ozN}$, wherein $P_{el,actual}$ and $c_{oz}$ is selected in order to achieve the required generator power $P_{target}$, wherein a performance map $P_{oz}(P_{el}, \varphi N)$ is determined for the ozone generator, and according to step A) based on the characteristic performance map a minimum gas flow $\varphi$min and/or a minimum electrical power $P_{el,min}$ is determined and in step B) $\varphi_{actual}\geq\varphi_{min}$ and/or $P_{el,actual}\geq P_{el,min}$ is selected.

2. The method according to claim 1, wherein $P_{el,actual}$ and $c_{oz}$, actual are selected in such a way that the operating costs of the consumption of the operating resources are reduced in comparison by both a reduction in electrical power with consistent gas flow $\varphi_{N,max}$ with an ozone concentration $c_{ozN}$ and a reduction in gas flow $\varphi_{N,actual}$ with consistent ozone concentration $c_{ozN}$.

3. The method according to claim 1, wherein based on the characteristic performance map, multiple combinations of reduced electrical power $P_{el,actual}$ and reduced ozone concentration $c_{oz,actual}$ are determined and for each of these combinations, the associated operating costs are determined and in step B) the combination is selected at which the operating costs are the lowest.

4. The method according to claim 1, wherein based on the characteristic performance map, multiple combinations of reduced electrical power $P_{el,actual}$ and reduced ozone concentration $c_{oz,actual}$ are determined, and for each of these combinations the associated operating costs are determined, and an interpolation is made between the determined operating costs and based on the interpolation, a combination is determined, at which the operating costs are minimal, wherein the combination determined in this way is selected in step B).

5. A method according to claim 1, characterized in that in step B), the gas flow is also reduced ($\varphi_{N,ACTUAL}<\varphi_{N,max}$).

* * * * *